United States Patent
Wong et al.

(10) Patent No.: US 6,283,280 B1
(45) Date of Patent: Sep. 4, 2001

(54) COMPACT DISC CONTAINER WITH LOCKING TUBE

(75) Inventors: Ming-Sen Wong, Taipei; Chen-Cheng Chang, Tao Yuan Shien, both of (TW)

(73) Assignee: CMC Magnetics Corporation, Taipei (TW)

( * ) Notice: Subject to any disclaimer, the term of this patent is extended or adjusted under 35 U.S.C. 154(b) by 0 days.

(21) Appl. No.: 09/512,057

(22) Filed: Feb. 24, 2000

(30) Foreign Application Priority Data

Jun. 10, 1999 (TW) .................................................. 88209531

(51) Int. Cl.[7] .................................................. B65D 85/57
(52) U.S. Cl. ......................................... 206/308.1; 206/310
(58) Field of Search .................................... 206/303, 307, 206/308.1, 310, 493

(56) References Cited

U.S. PATENT DOCUMENTS

| | | | |
|---|---|---|---|
| 5,377,825 | * 1/1995 | Sykes et al. | 206/310 X |
| 5,549,198 | * 8/1996 | Thiele et al. | 206/307 |
| 5,894,924 | * 4/1999 | Koch | 206/310 |
| 6,016,909 | * 1/2000 | Chang | 206/310 |

* cited by examiner

Primary Examiner—Bryon P. Gehman
(74) Attorney, Agent, or Firm—Dougherty & Troxell

(57) ABSTRACT

A compact disc container includes a box defining a unitary space in which a tube projects upwardly from a bottom center thereof. A seat located around a lower outer end of the tube extends upwardly from a bottom surface of the box. The tube has a locking hole provided near a top thereof for a locking knob to engage and tighten thereto. More than one compact disc may be superimposed in the box around the tube with a lowermost compact disc supported on the seat without frictionally contacting the bottom surface of the box. The locking knob is tightened to the locking hole in the tube and locates the superimposed compact discs in the box. The unitary space of the box allows accommodation of more than one compact disc and effectively reduces costs otherwise needed for packing the compact discs individually.

1 Claim, 5 Drawing Sheets

COMPACT DISC CONTAINER WITH LOCKING TUBE

BACKGROUND OF THE INVENTION

The present invention relates to a compact disc container, and more particularly to a compact disc container into which more than one compact disc can be sequentially superposed. The container saves space and costs which would otherwise be required for packing individual compact discs without sacrificing an attractive appearance of the package.

With the popularization of digital compact discs that provide high storage capacity and high quality audio and video signals, a variety of containers have been developed. The earliest and most common compact disc container includes a shallow box for accommodating one single compact disc, a cover hinged to the box, and a compact disc supporting plate in the shallow box. The supporting plate includes an annular recess for receiving a compact disc, and a centered retaining key having multiple radially inward extended claws. By aligning a central hole of the compact disc with the retaining key and lightly pressing the compact disc against the supporting plate, the compact disc can be firmly located in the box. And, by depressing the radial claws of the retaining key, the compact disc can be released from the retaining key and removed from the supporting plate. For promotion purpose, one side of the compact disc is usually printed with a design and a colored advertising insert is set in the container before the container is wrapped with a clear thin sheet. The colored advertising insert is manually set in the compact disc container. While the individual advertising insert increases the quality of the compact disc package for promotion purpose, it is a time and cost consuming work to manually set such advertising insert in each individual container, particularly when there are multiple pieces of compact discs that actually have the same theme. To solve this problem, an album type container having a printed appearance has been developed for receiving multiple pieces of compact discs. However, such album type compact disc containers have a different and less attractive appearance than that of the common compact disc containers. These are also less convenient for display on a shelf along with other compact disc containers. There is another type of big box in a dark color which has been developed for receiving multiple compact discs. Compact discs received in a big box are first individually received in a simple envelope and then sequentially superimposed on one another in the box. Due to the simple package, the big boxes for multiple compact discs lack the quality to attract general consumers.

SUMMARY OF THE INVENTION

It is a primary object of the present invention to provide a compact disc container for accommodating more than one compact disc and at the same time to reduce space, cost, and time required for packing compact discs without sacrificing an attractive appearance of the container.

To achieve the above and other objects, the present invention contemplates a box defining a unitary space in which a tube projects upwardly from a bottom center thereof. A seat around a lower outer end of the tube is slightly raised from a bottom surface of the box. The tube has a locking hole provided near a top thereof for a locking knob. More than one compact disc may be superimposed in the box around the tube with a lowermost compact disc supported on the raised seat without contacting the bottom surface of the box. The locking knob is the n tightened to hold the superimposed compact discs in the box. The unitary space of the box allows accommodation of more than one compact disc and effectively reduces cost for packing the compact discs individually.

BRIEF DESCRIPTION OF THE DRAWINGS

The structure of the present invention can be best understood by referring to the following detailed description of the preferred embodiments and the accompanying drawings, wherein.

DETAILED DESCRIPTION OF THE PREFERRED EMBODIMENTS

Figure 1:
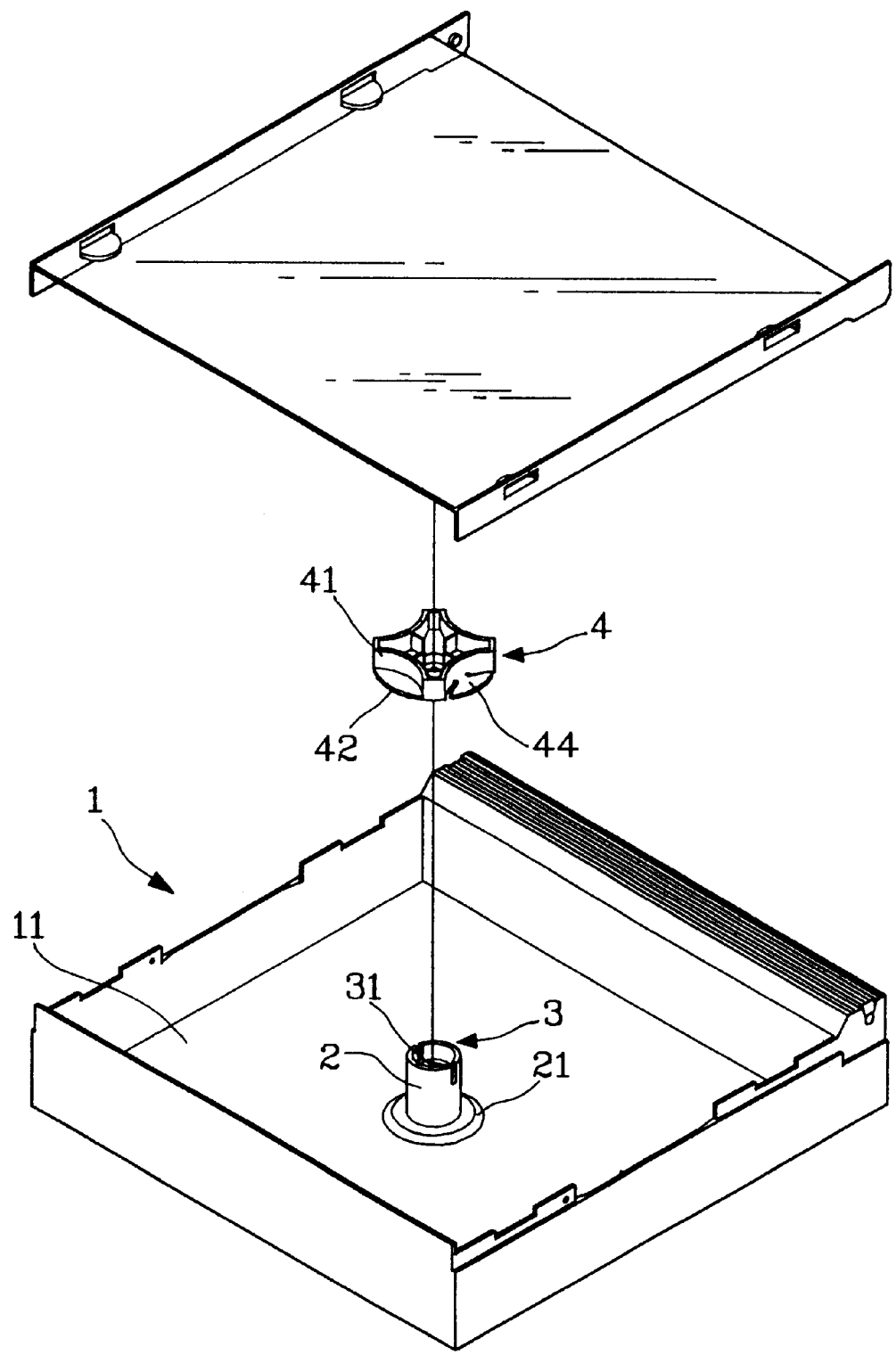
FIG. 1 is an exploded perspective view of a compact disc container according to the present invention.
Figure 2:
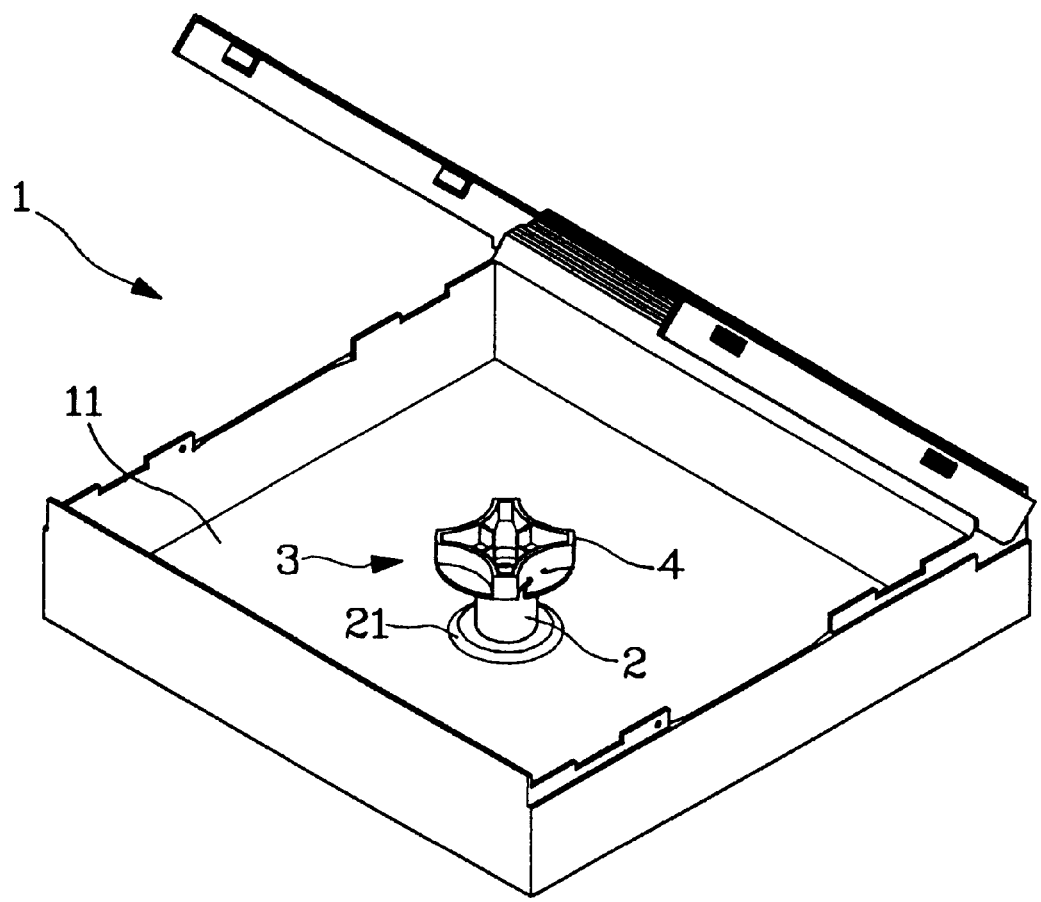
FIG. 2 is an assembled perspective of the compact disc container of FIG. 1.
Figure 3:
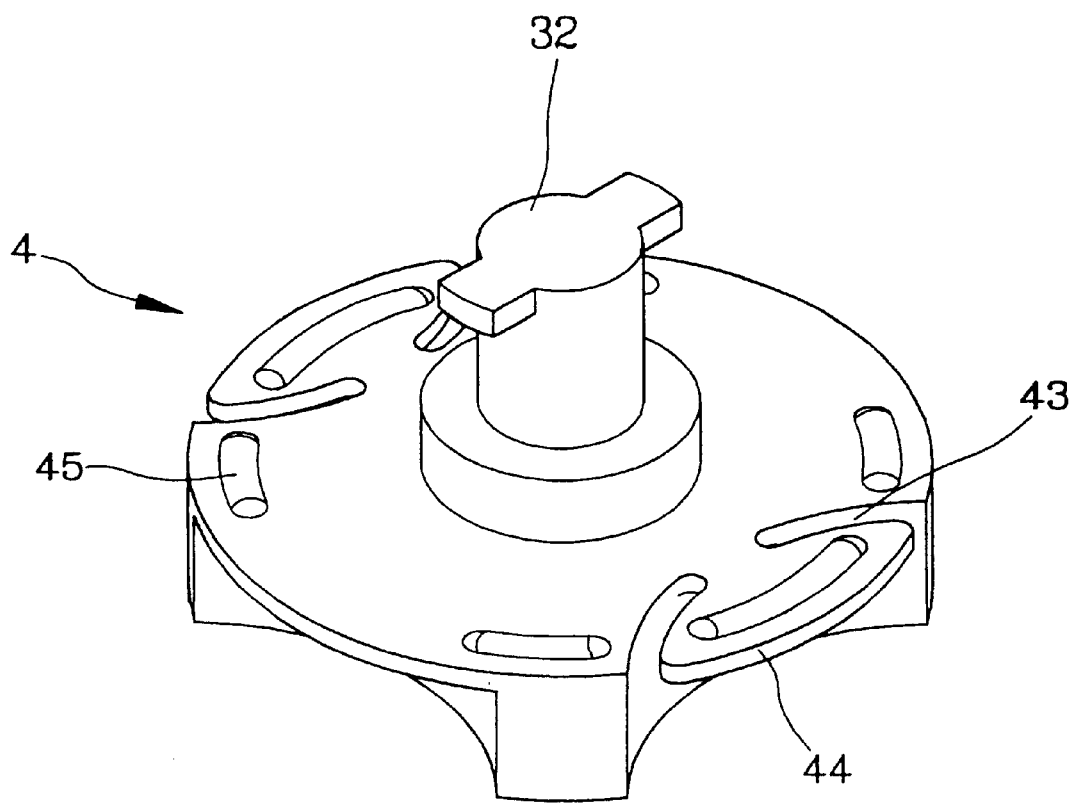
FIG. 3 is a bottom perspective of a locking knob incorporated in the present invention.

Please refer to FIGS. 1, 2, 3, and 5. As shown the therein. The present invention provides a compact disc container that includes a box 1 defining a unitary space 11, an upward projecting tube 2, an interlocking mechanism 3, and a locking knob 4.

The box 1 is generally similar to a conventional compact disc container for packing a single compact disc but has an increased height compared to the conventional compact disc container.

The tube 2 projects upwardly from a bottom surface of the box 1 and is centered in the unitary space 11. A seat 21 is located around a lower end of the tube 2 and slightly raised from the bottom surface of the box 1.

The interlocking mechanism 3 includes a locking hole or opening 31 formed on a plate in and near a top of the tube 2, and a key 32 downward projected from a bottom of the locking knob 4. The locking hole 31 has a generally round middle portion with two narrow cuts extending from two diametrically opposite points of the round middle portion. The key 32 has a profile corresponding to the shape of the locking hole 31, that is, a generally round middle portion and two diametrically opposite narrowed side portions. Two ramps 311 are provided below and along the locking hole 31. Two stoppers 312 are provided at two diagonally opposite ends of the two ramps 311. When the key 32 is extended through the locking hole 31 and turned, it can be tightened and locked to the top of the tube 2.

The locking knob 4 includes a generally cross-shaped handle portion 41 upwardly raised from an intermediate plate 42. The handle portion 41 has four inward curved walls for gripping with a hand. The key 32 projects downwardly from a lower surface of the intermediate plate 42. The intermediate plate 42 is provided at predetermined positions with cuts 43, so that two elastic wings are formed on the intermediate plate 42 at two opposite sides of the cross-shaped handle portion 41, elastic wings 44 are formed on the intermediate plate 42 at two opposite sides of the cross-shaped handle portion 41. Downwardly protruding ribs 45 are disccontinuosly provided along the lower outer edge of the intermediate plate 42 including the portions forming the wings 44.

Figure 4:
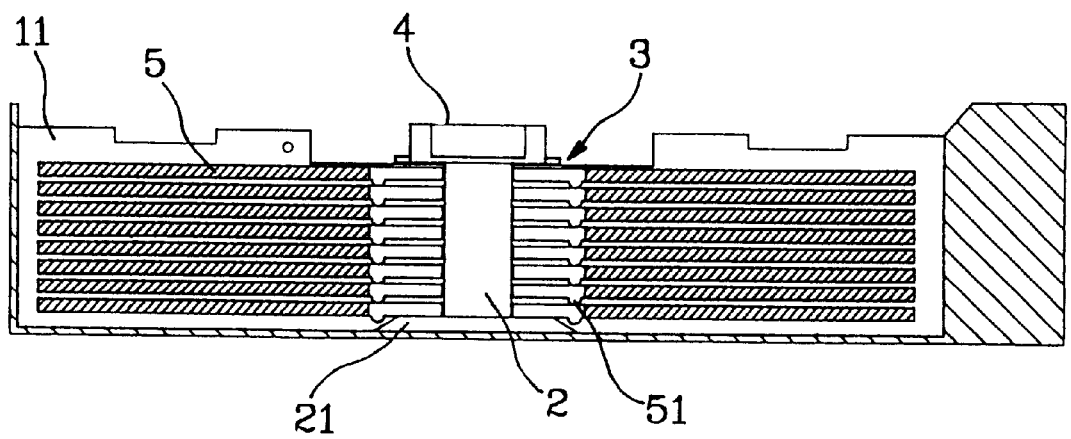
FIG. 4 is a cross-sectional view of the compact disc container of the present invention.

Refer now to FIG. 4. More than one compact disc 5 may be sequentially superimposed in the unitary space 11 around the tube 2. The raised seat 21 around the lower end of the tube 2 supports a lowermost compact disc 5 and keeps it from frictional contact with the bottom surface of the box 1. Other compact discs 5 are superimposed on the lowermost compact disc 5 and kept from frictionally contacting with one another because of a raised ring 51 that is generally provided around a central hole of the compact disc 5 to slightly protrude from a recording surface of the compact disc 5. After a predetermined number of compact discs 5 have been superimposed in the box 1, the locking knob 4 is closed at the top of the tube 2 with the key 32 which is aligned with and extends through the locking hole 31.

Figure 5:
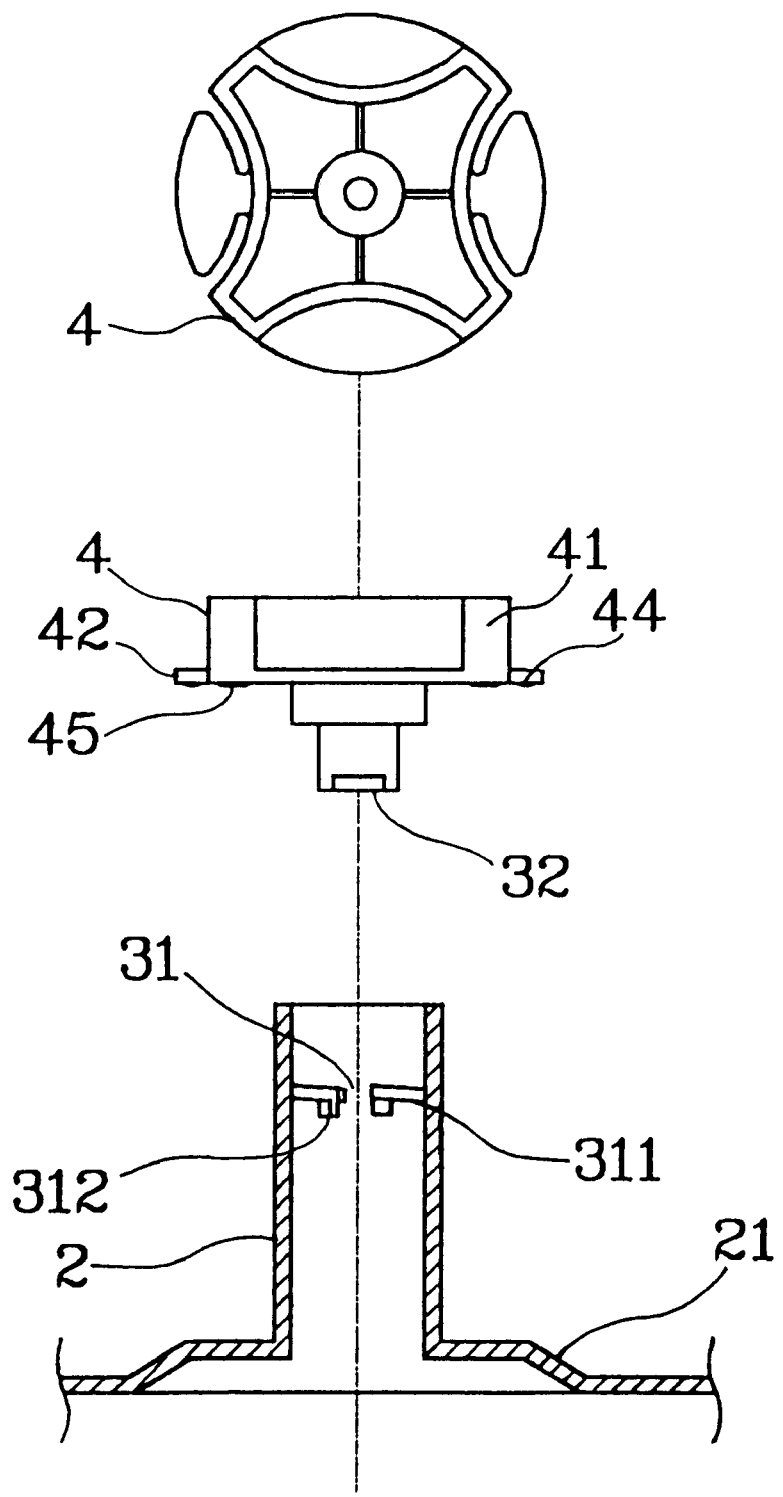
FIG. 5 illustrates the manner in which the locking knob is aligned with a locking hole provided in an upward projected tube in the compact disc container.
Figure 6:
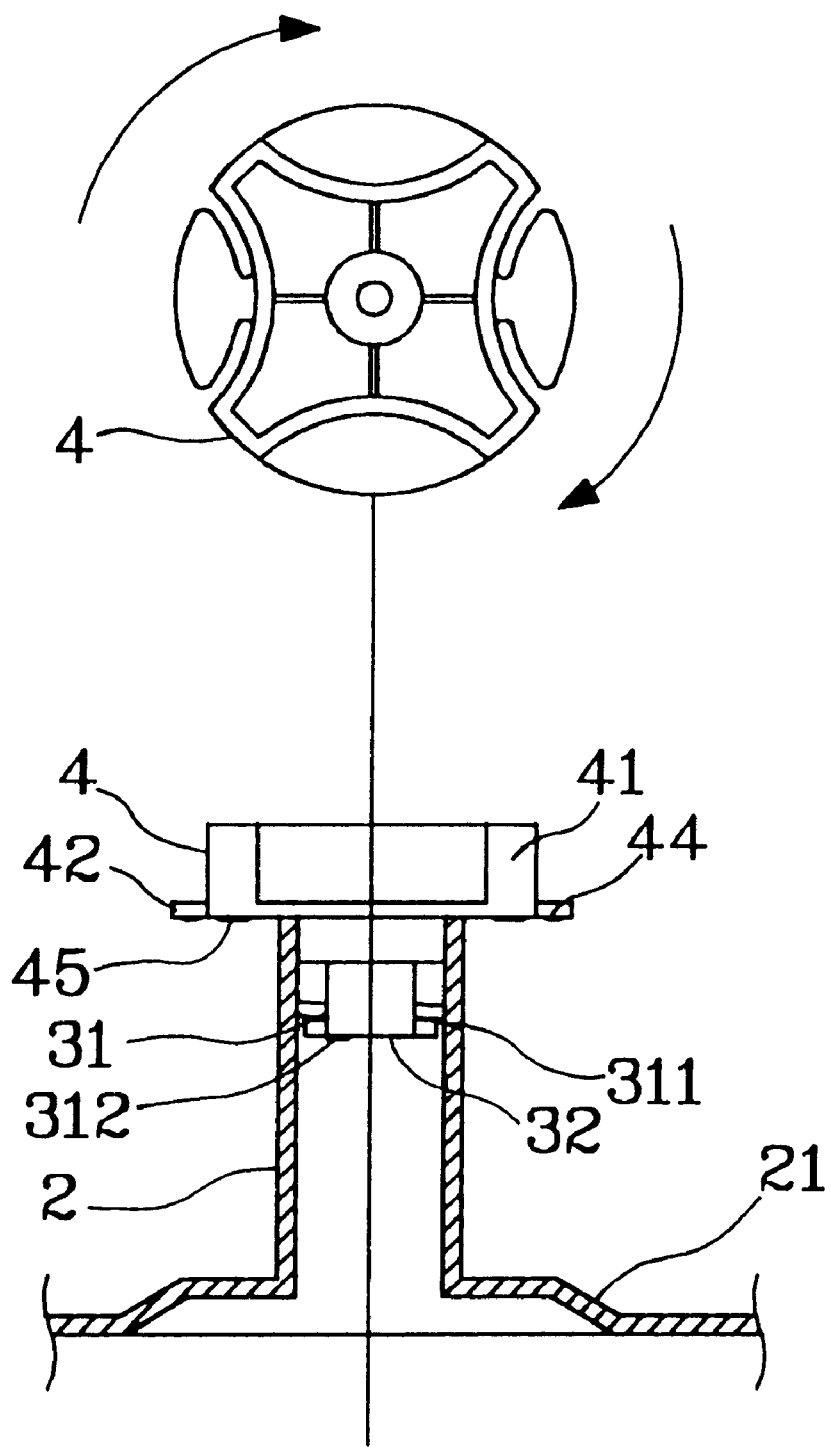
FIG. 6 illustrates the manner in which the locking knob is turned to lock it to the locking hole.

FIGS. 5 and 6 illustrate the manner of operating the locking knob 4 to lock the superimposed compact discs 5 in place. A user grips the cross-shaped handle portion 41 of the locking knob 4 to align the key 32 below the intermediate plate 42 of the locking knob 4 with the locking hole 31 in the tube 2 before inserting the key 32 into the locking hole 31. The locking knob 4 may be the n turned relative to the tube 2 so that the two narrowed side portions of the key 32 are guided by the two ramps 311 to move forward until they separately reach and press against the stoppers 312. At this point, the locking knob 4 is tightened against the tube 2. When the locking knob 4 is tightly locked to the tube 2, the ribs 45 below the intermediate plate 42 and the elastic wings 44 would also tightly press against a topmost compact disc 5 to enhance the locating function of the interlocking mechanism 3.

With the above arrangements, more than one compact disc 5 can be superimposed in a unitary space 11 in one single box 1 to allow an integral packaging. Only one sheet of printed advertising insert is sufficient to give the whole package a high quality appearance. Time and cost that is otherwise needed to prepare numerous single-piece disc containers and colored prints and to pack each individual compact disc into a separate disc container can be saved. Since the compact disc container of the present invention has width and length the same as that of the conventional single-piece compact disc container, it can be attractively and conveniently displayed on a rack along with other conventional compact disc containers. The heights of the box 1 and of the tube 2 could be varied with the number of compact discs 5 to be superimposed in the box 1. Compact disc containers according to the present invention may be manufactured to have several standard specifications separately for containing, for example, 3, 4, 5 . . . or 10 compact discs 5, so that more choices are available for general consumers.

The compact discs 5 superimposed in the box 1 can be conveniently and safely located in place with out frictionally contacting with one another to cause any damage to one another. And, the simplified package allows reduced manufacturing cost and selling price with out sacrificing the high quality appearance the re of.

A preferred embodiment of the invention is shown. However, various changes in the shape, size, and arrangements of parts may be resorted to with out departing from the spirit of the invention or the scope of the claims.

What is claimed is:

1. A compact disc container comprising a box defining a unitary space having a bottom surface and a tube extending upwardly from said bottom surface, said tube including upper and lower ends, a seat disposed around said lower end of said tube and slightly raised from said bottom surface and adapted to receive a first compact disc thereon and to prevent said compact disc from contacting said bottom surface of said box, and said upwardly extending tube adapted to receive additional compact discs superimposed on said first compact disc, a locking hole located in said upper end of said upwardly extending tube and a locking knob for engaging said locking hole for holding said compact discs superimposed on one another and wherein said box has a length and width similar to that of a commercially available compact disc container, but has an increased height, said locking hole being formed on a plane near the top of said tube and including a generally round middle portion and two diametrically opposite narrowed side portions, said locking knob including a downwardly projecting key from a bottom side the re of and having a profile corresponding to that of said locking hole so that said key may be inserted into said locking hole and turned to lock said locking knob to said locking hole, two ramps being provided below and along said locking hole with stoppers provided at two diagonally opposite ends of said two ramps; said locking knob also including a generally cross-shaped handle portion, said handle portion having four inward curved walls for easy grip with a hand; and an intermediate plate existing between said handle portion and said key, cuts being provided on said intermediate plate at predetermined positions to form elastic wings, and ribs being disccontinuosly provided along an outer edge of the bottom side of said intermediate plate, including said two elastic wings.

* * * * *